Patented Apr. 21, 1936

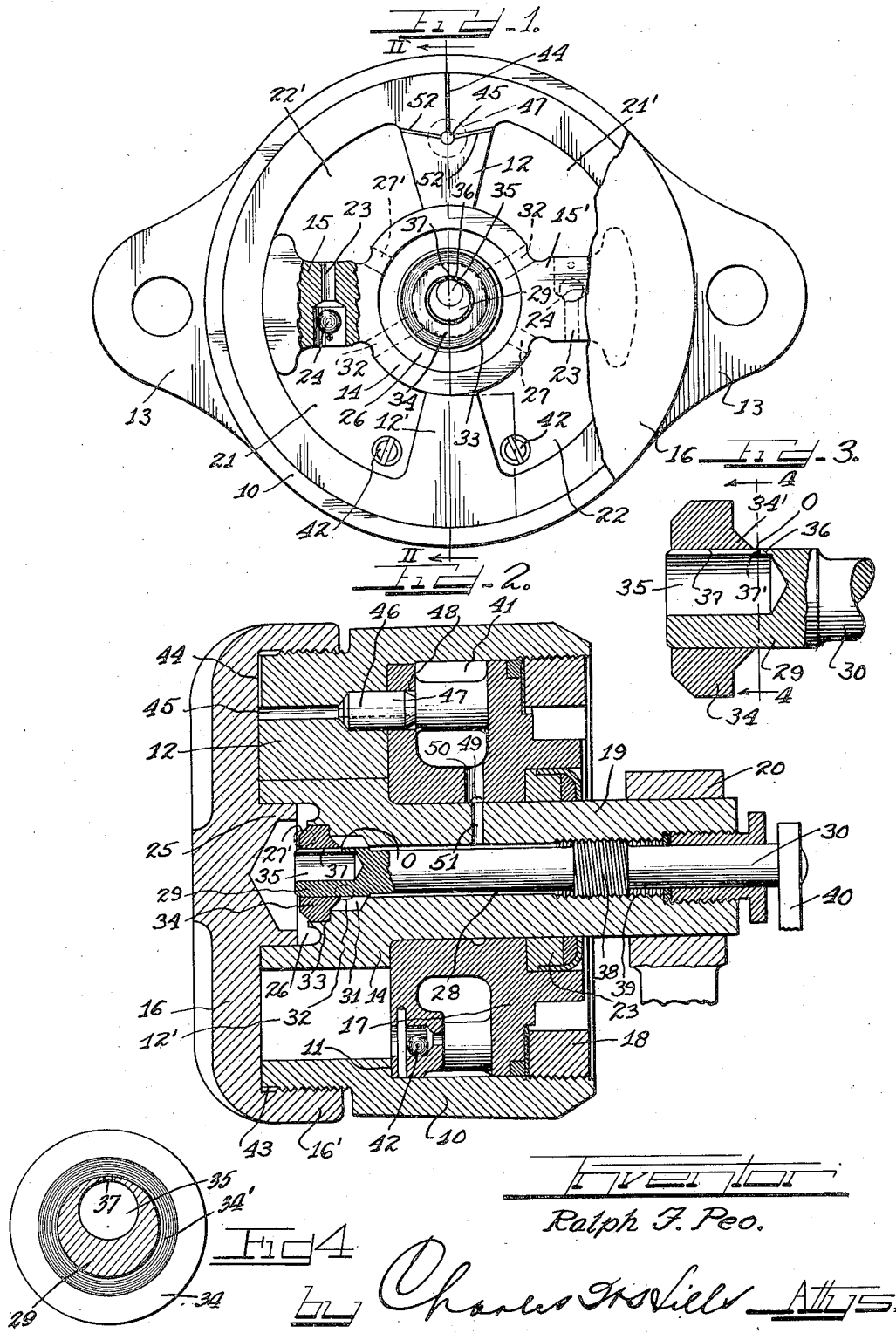

2,037,820

UNITED STATES PATENT OFFICE 2,037,820

HYDRAULIC SHOCK ABSORBER

Ralph F. Peo, Buffalo, N. Y., assignor to Houde Engineering Corporation, Buffalo, N. Y., a corporation of New York Application January 13, 1934, Serial No. 706,490

14 Claims. (Cl. 188—89)

My invention relates to hydraulic shock absorbers and particularly to those of the rotary balanced vane type and the important object of the invention is to provide improved construction and assembly for the shock absorber body or housing, and improved valving arrangement for metering and controlling the displacement of the hydraulic fluid during operation of the shock absorber.

The various features of my invention are incorporated in the structure shown on the drawing, in which drawing—

Figure 1 is a plan view of the shock absorber with the cover member thereof removed;

Figure 2 is a section on plane II—II Figure 1;

Figure 3 is an enlarged section of the valve head and seat member; and

Figure 4 is a section on plane IV—IV Figure 3.

The body or housing of the shock absorber shown comprises the annular cylindrical wall 10 which at its outer end is of decreased internal diameter to leave an internal shoulder 11, and at the decreased diameter end upper and lower partition lugs 12 and 12' extend radially inwardly. Extending laterally from the outer edge of the wall 10 are ears 13 by which the housing may be secured to a support such as the chassis frame of an automobile.

Between the lugs 12 and 12' is a piston structure comprising a cylindrical hub 14 which engages the inner faces of the lugs and has diametrically opposite vanes 15 and 15' extending therefrom and engaging at their outer faces with the inner cylindrical face of the housing between the lugs 12 and 12'. A closure or cover part 16 has the flange 16' which is secured to the wall 10 by engagement with the threaded outer reduced end of the wall, this cover engaging against the outer face of the wall 10 and the outer faces of the partition lugs.

Fitting into the inner end of the annular wall 10 is the inner wall structure 17 which seats against the shoulder 11 and against the inner faces of the lugs 12 and 12'. The wall structure 17 is held in such position by an internal annular nut 18 which threads into the wall 10 and abuts the wall structure 17. The wall structure 17 has an axial passageway forming a bearing for the shaft 19 which extends from the piston structure hub 14, the shaft at its outer end having secured thereto a lever 20 which, when the shock absorber is in service, is connected usually with the axle of the vehicle so that during running of the vehicle and relative movement between the axle and the chassis thereof, the piston structure will be oscillated. The piston structure and the wall 10 and the lugs extending therefrom define high pressure working chambers 21 and 21' and low pressure working chambers 22 and 22'. Suitable packing 23 may be secured in the wall structure 17 around the piston shaft to prevent leakage of hydraulic fluid to the exterior of the shock absorber.

Each of the piston vanes has a fluid passage 23 therethrough controlled by a check valve such as a ball 24, the arrangement being such that fluid may flow through these passageways from the low pressure chambers to the high pressure chambers but will prevent flow through the passageways in the opposite direction.

At its outer end the piston hub is recessed to receive the aligning lug 25 extending from the cover 16 partway into the recess to leave the space 26 which space is connected by ports 27 and 27' with the low pressure chambers 22 and 22' respectively.

Extending axially through the piston shaft and its hub and terminating at the space 26 is the cylindrical bore 28 for receiving the valve structure comprising a cylindrical valve head or plug 29 and the stem 30. The bore has the enlargement 31 forming an annular channel around the valve plug which channel is in communication with the high pressure chambers 21 and 21' through ports or passages 32 and 32' respectively. At its outer end the bore is further enlarged to form a cylindrical pocket 33 for receiving the valve seat member 34, the valve head extending through and journalled in this seat member. The seat member may be threaded into the pocket 33 or may be held therein by friction.

The cylindrical valve head has the cylindrical bore 37 extending longitudinally thereinto from the outer end thereof, this bore being open to the space 26. The axis of the bore 35 is at one side of the axis of the valve head so as to leave the thin wall 36 along one side of the head through which wall is cut the longitudinally extending slot 37. The inner end 34' of the seating member 34 is in the form of a conical flange whose edge crosses the slot 37 a short distance from the inner edge 37' of the slot 37 so as to define a restricted orifice O between the annular channel 31 and the bore 35 of the valve head, this orifice controlling the resistance to flow of fluid from the high pressure chambers to the low pressure chambers of the shock absorber. During the bump strokes of the shock absorber, that is, when the vehicle chassis and axle approach each other, the passageways 23 through the piston vanes are open and the fluid can readily flow from the low pressure chambers to the high pressure chambers through the passageways and also through the orifice O, but during rebound strokes of the shock absorber piston, that is, when the chassis and axle move away from each other, the check valves 24 close the passageways 23 and all of the fluid flow from the high pressure chambers to the low pressure chambers must be through the restricted orifice O, the path of such flow being through the ports 32—32', the annular channel 31, the orifice O, the bore 35 of the valve head, the space 26, and the ports 27—27' to the low pressure chambers.

Provision is made for adjustment of the orifice. In the arrangement shown the valve stem has a threaded section 38 for engaging the internal threading 39 in the bore 28 so that when the stem is turned the same will move axially to bring the inner edge or end 37' of the slot 37 closer to or further away from the edge of the conical flange 34' of the seat member to increase or decrease the area of the orifice O. To facilitate turning of the valve stem it may be provided at its outer end with a lever or finger piece 40.

The wall 36 is preferably made sufficiently thin so that the orifice O will have the characteristics of a knife-edge orifice and will function to practically compensate for variations in viscosity of the hydraulic fluid under temperature changes and will cause the shock absorber resistance to be practically independent of viscosity variations.

The wall structure 17 of the shock absorber body has the annular space 41 forming a fluid reservoir from which fluid may flow past a check valve 42 into the lower working chambers 21 and 22. Any fluid which may be forced out of the pressure chamber between the cover 16 and the wall 10 will find its way to the annular recuperating channel 43 at the base of the cover thread, the escaped fluid flowing from the top of the recuperating channel into a groove or channel 44 provided in the outer face of the partition lug 12, this groove communicating with the bore 45 extending transversely through the lug 12 and connecting with the restricted passage 46 through a dowel pin 47 for delivering the collected fluid to the reservoir 41. This pin 47 receives the opening 48 through the inner wall of the wall structure 17 and serves to properly align this wall structure when assembled in the shock absorber housing wall 10.

Any fluid which may be forced out along the shaft 19 is intercepted by the annular channel 49 and returns to the reservoir 41 through the passage 50. The annular groove 49 is also connected by a passage 51 with the bore 28 in the piston shaft so that any fluid flowing into the bore will be returned to the reservoir.

Small grooves 52 may be provided in the outer face of the upper lug 12 for connecting the tops of the upper working chambers with the passage 45 so that any air or gas collecting at the tops of the working chambers may find its way to the reservoir.

I have shown and described a practical and efficient embodiment of the features of my invention, but I do not desire to be limited to the exact construction and arrangement shown and described as changes and modifications may be made without departing from the scope and spirit of the invention.

I claim as follows:

1. In a hydraulic shock absorber, a housing providing a chamber for hydraulic fluid, a piston operable within said chamber to displace the fluid, means affording a path for flow of fluid from one side of the piston to the other, a valve chamber included in said path, a valve having a passageway for inclusion in said path and a thin wall between said passageway and valve chamber, a longitudinally extending slit in said thin wall terminating in said valve chamber and forming a sharp edge orifice, a seat member surrounding said valve and having a flange terminating in a sharp edge overlying said orifice slit, and means for causing movement of said valve in said seat member to thereby control the extent of exposure of said orifice slit to the flow of fluid through said path and thereby determine the hydraulic resistance to such flow.

2. In a hydraulic shock absorber, a housing providing a chamber for hydraulic fluid, a piston operable within said chamber to displace the fluid, means affording a path for flow of fluid from one side of the piston to the other, a valve chamber included in said path, a cylindrical valve having a longitudinal bore close to one side of said valve to leave a thin wall between the bore and the valve chamber, a longitudinally extending slit in said thin wall terminating at said valve chamber and forming a sharp edged orifice, a stationary seat member for said valve having a flange terminating in a sharp edge surrounding said valve and overlying said orifice slit, and means for causing longitudinal adjustment of said valve in said seat member to thereby control the extent of exposure of said orifice slit to the flow of fluid through said path and thereby determine the hydraulic resistance to such flow.

3. In a hydraulic shock absorber, a housing providing a chamber for hydraulic fluid, a piston structure operable within said chamber to displace the fluid therein, a valve chamber in said piston structure, a valve seat member interposed in said valve chamber, a valve slidable in said seat and having a longitudinal bore communicating at one end with said valve chamber at one side of said seat member, said valve having a sharp edged orifice between said valve bore and said valve chamber at the opposite side of said seat member, said seat member having a flange terminating in a sharp edge extending across said orifice, means for shifting said valve in said seat member to adjust for the degree of overlap of said orifice by said sharp edge to thereby determine the hydraulic resistance to flow through said orifice, and passageways communicating with said valve chamber at opposite sides of said seat member and connecting with said chamber at opposite sides of said piston structure, whereby the displaced fluid will flow through said orifice.

4. In a hydraulic shock absorber, a housing providing a chamber for hydraulic fluid, a piston structure operable within said chamber to displace the fluid therein, means affording a path for flow of fluid from one side of the piston structure to the other, two cooperable members one of which has a narrow slot therethrough forming a short sharp edged orifice and the other member having a sharp edge flange overlying said slot, and means for moving one of said members for determining the extent of such overlap and thereby the hydraulic resistance to flow through said orifice.

5. In a hydraulic shock absorber, a housing structure comprising a cylindrical annular wall, partition lugs extending from said wall at one end thereof and a detachable cover structure attached to said end of said wall and abutting the adjacent sides of said lugs, a side wall structure fitting into the other end of said annular wall and abutting against the other side of said lugs, means for securing said side wall structure, a piston structure comprising a hub interposed between said cover structure and said side wall structure and bearing against the inner ends of said lugs, piston vanes extending from said piston hub and engaging at their outer ends against said annular wall between said lugs, said vanes and said lugs defining high and low hydraulic pressure chambers in which hydraulic fluid is displaced when said vanes are oscillated, a shaft extending from said piston structure and journalled in said side wall structure, means affording a path for the flow of fluid between the high pressure chambers and the low pressure chambers, means for controlling the resistance to such flow, and a fluid reservoir formed in said side wall structure, and a connection between said fluid reservoir and said working chambers for the flow of replenishing fluid.

6. In a hydraulic shock absorber, a housing structure comprising a cylindrical annular wall, a partition lug extending radially inwardly from said wall at one end thereof, a detachable cover structure secured to said end of the wall, a side wall structure in the other end of said annular wall, said cover structure and said side wall structure engaging against the opposite sides of said lug and defining with said annular wall a working chamber for containing hydraulic fluid, a piston structure operable within said chamber to displace the fluid therein, said side wall structure having a space forming a fluid reservoir, means connecting said reservoir with said working chamber to supply replenishing fluid thereto, a recuperating channel between the outer end of said annular wall and said cover structure for receiving fluid forced out of said working chamber, and means providing a return passage from the upper part of said recuperating channel to said reservoir for the return of collected fluid to said reservoir.

7. In a hydraulic shock absorber, a housing structure comprising a cylindrical annular wall, a partition lug extending radially inwardly from said wall at one end thereof, a detachable cover structure secured to said end of the wall, a side wall structure in the other end of said annular wall, said cover structure and said side wall structure engaging against the opposite sides of said lug and defining with said annular wall a working chamber for containing hydraulic fluid, a piston structure operable within said chamber to displace the fluid therein, said side wall structure having a space forming a fluid reservoir, means connecting said reservoir with said working chamber to supply replenishing fluid thereto, a recuperating channel between the outer end of said annular wall and said cover structure for receiving fluid forced out of said working chamber, and means providing a return passage from the upper part of said recuperating channel to said reservoir for the return of collected fluid to said reservoir, and a dowel pin having a bore included in said return passageway, said dowel pin serving as a means for aligning and holding said side wall structure in alignment.

8. A valve structure for hydraulic shock absorbers including a cylindrical valve, a valve seat member having a cylindrical bore in which said valve seats and is movable, said valve having a thin wall provided with a longitudinal slot forming a sharp edged orifice, said valve seat member having a sharp edged flange overlapping said orifice, and means controlling the movement of said valve to adjust for the extent of overlap of said orifice by said flange.

9. A valve structure for hydraulic shock absorbers including a valve member, a valve seat member having a bore in which said valve member seats and is movable, said valve member having a thin wall provided with a slot forming a sharp edge orifice, said valve seat member having a sharp edged flange overlapping said orifice, and means for setting one of said members to adjust for the extent of overlap of said orifice by said flange.

10. A valve structure for hydraulic shock absorbers including a cylindrical valve member bored longitudinally to leave a thin wall, said wall having a longitudinally extending slot forming a sharp edge orifice, a valve seat member having a cylindrical bore in which said valve member seats and is movable, said valve seat member having a sharp edged flange overlapping said orifice, and means for setting one of said members to adjust for the extent of overlap of said orifice by said flange.

11. A valve assembly for controlling the flow of hydraulic fluid in a hydraulic shock absorber, comprising two valve members, one of said valve members being tubular and having a thin wall provided with a longitudinally extending slot forming a sharp edge orifice, the other valve member surrounding said tubular valve member and having a sharp edged flange overlapping said orifice, and means for moving one of said members to adjust for the extent of overlap of said orifice by said flange.

12. In a hydraulic shock absorber, the combination of an annular wall radially inset at one end to provide an external neck and an internal shoulder, said inset end surrounding a hydraulic working chamber, a wall within said annular wall engaging said internal shoulder and forming one side closure for said hydraulic chamber, a cover detachably secured to said neck and forming the other side closure for said working chamber, and a piston structure operable in said hydraulic chamber and having a shaft extending through and journalled in said wall which engages said internal shoulder.

13. A valve assembly for controlling the flow of hydraulic fluid in a hydraulic shock absorber comprising two valve members, one of said valve members having an elongated knife edge slit, the other member having a flange overlapping said slit and terminating in a knife edge which cooperates with one end of said slit to form a knife edge orifice, and means for moving one of said members to adjust the size of said orifice.

14. A valve assembly for controlling the flow of hydraulic fluid in a hydraulic shock absorber comprising two concentric valve members, one of said members having a knife edge slot, the other member having a flange terminating in a knife edge extending across said slot adjacent to one end thereof to form a knife edge orifice, and means for moving one of said members to adjust the size of said orifice.

RALPH F. PEO.